J. J. CURTIS.
TRAP.
APPLICATION FILED FEB. 5, 1917.

1,282,544.

Patented Oct. 22, 1918.

Inventor:
Jeremiah J. Curtis,
by his attorney,
Charles S. Gooding.

UNITED STATES PATENT OFFICE.

JEREMIAH J. CURTIS, OF WOLLASTON, MASSACHUSETTS.

TRAP.

1,282,544. Specification of Letters Patent. Patented Oct. 22, 1918.

Application filed February 5, 1917. Serial No. 146,599.

*To all whom it may concern:*

Be it known that I, JEREMIAH J. CURTIS, a citizen of the United States, residing at Wollaston, in the county of Norfolk and State of Massachusetts, have invented new and useful Improvements in Traps, of which the following is a specification.

This invention relates to a trap particularly adapted to be used in connection with baths.

The object of the invention is to provide a trap in which the cleanout cover is so constructed as to be under a water seal.

The invention consists in a trap constructed as hereinafter set forth in the specification and particularly in the combination of elements set forth in the claims.

Referring to the drawings.

Like numerals refer to like parts throughout the several views of the drawings.

Figure 1:
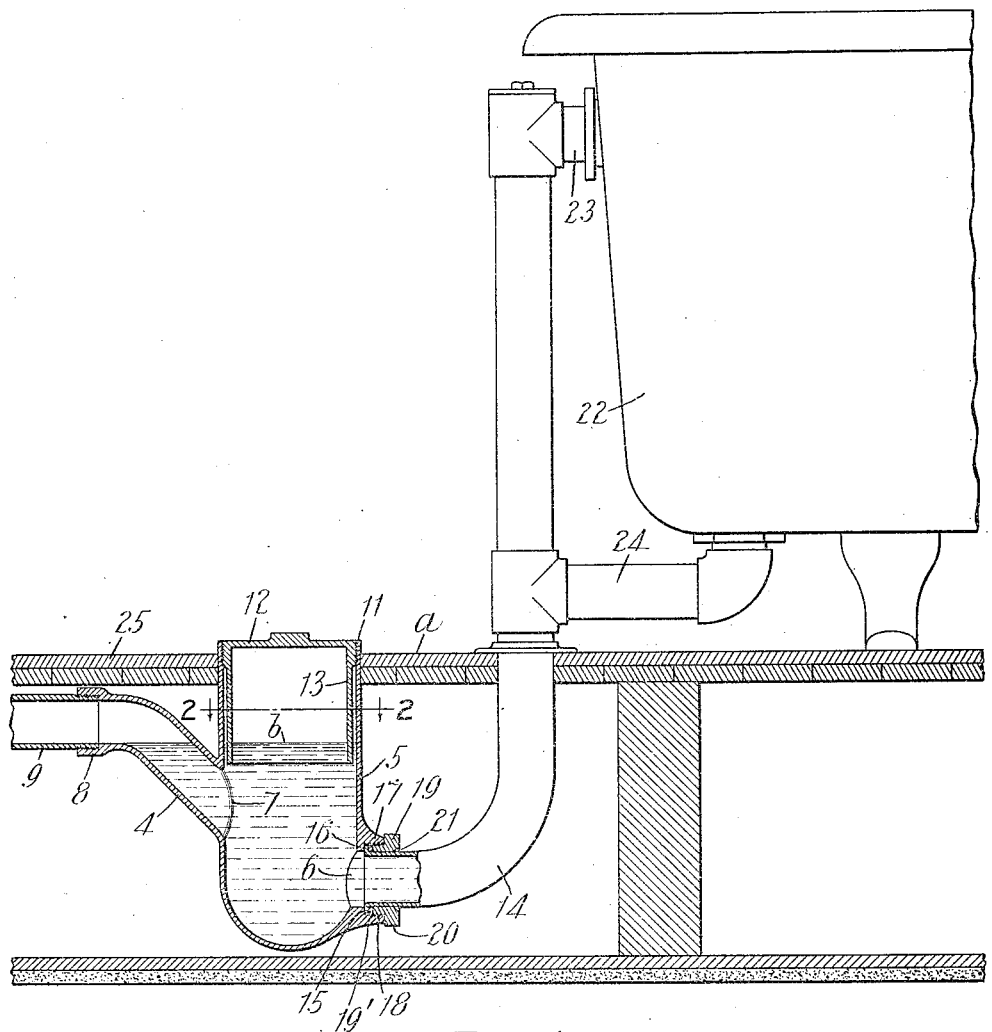
Figure 1 is a side elevation, partly in section, illustrating my improved trap in connection with a bath tub.
Figure 2:
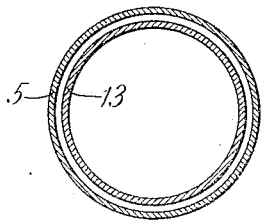
Fig. 2 is a sectional plan taken on line 2—2 of Fig. 1.

In the drawings, 5 is the body portion of the trap, preferably formed of cast iron and having an inlet port 6 adjacent its lower end and a discharge port 7 located above said inlet port with a discharge branch or pipe 4 leading outwardly and upwardly from said discharge port 7 and terminating in an interiorly screw-threaded flange 8, to which is attached a pipe 9 by screw-threaded engagement therewith.

The body portion 5 of said trap is preferably cylindrical and extends upwardly above the discharge outlet 7 to and preferably slightly above the floor line *a*. The bottom of the outlet of the discharge branch or pipe 4 is located beneath the top edge 11 of the body portion 5. A removable cover 12 has screw-threaded engagement with the upper end of the body portion 5 of the trap and is provided with a flange 13, preferably cylindrical, extending downwardly from the cover 12 to a point adjacent the upper edge of the discharge port 7. The outer diameter of said flange 13 is less than the inner diameter of that part of the body portion of the trap which extends above the discharge port 7.

The permanent level of water in the trap is substantially at the line *b* and the flange 13 projects downwardly into the trap below said permanent water level, thus forming a seal.

The body portion 5 and the discharge pipe 4 are preferably integral with each other and made of cast metal, such as cast iron, while the inlet pipe 14 is preferably formed of lead and has an exterior annular flange 15 on its end which bears against an interior annular flange 16 on the body portion 5, said interior annular flange 16 surrounding the inlet port 6.

A boss 17 integral with the body portion 5 extends outwardly from the inlet port 6 and from the annular flange 16 and is interiorly screw-threaded at 18 to receive a sleeve 19 which has screw-threaded engagement therewith. The sleeve 19 encircles the pipe 14 and its inner end preferably bears against a washer 19' and forces the same against the flange 15 said sleeve preferably having a flange 20 on its outer end which may be hexagonal in contour in order that the sleeve 19 may be easily rotated by means of a wrench and the inner end of said sleeve brought to bear against the washer 19', whereby said flange may be clamped firmly against the flange 16 on the body portion of the trap. The sleeve 19 is also preferably beveled on its inner edge as at 21 in order that solder may be introduced in the space between said edge 21 and the pipe 14 and the pipe 14 sweated into the sleeve 19 to form a tight joint.

In use the general level of the water stands substantially at the height of the line *b* (Fig. 1) and it will be seen that the flange 13 on the cover 12 projects downwardly into said water when it is at that level, thus forming a seal to prevent gas from backing up into the trap and passing out through the upper end thereof around the cover 12.

The outlet pipe 4 is connected in the usual manner with a bath tub 22 by waste pipes 23 and 24. 25 is the floor of the building in which the bath trap is located which may be of any usual construction.

Figure 3:
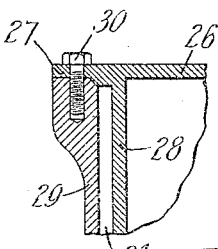
Fig. 3 is a sectional elevation of a portion of a modified form of my invention.

In Fig. 3 a modified form of my invention is illustrated in which the cover 26 has a horizontal flange 27 and a vertical flange 28, the vertical flange 28 corresponding to the flange 13 in that form of my invention illustrated in Fig. 1 and said cover is fastened to the body portion 29 of the trap by screws 30. In this form of my invention, as in that form illustrated in Fig. 1, there is an annular space 31 surrounding the flange 28 inside the body portion 29 of the trap.

I claim:

1. A trap having, in combination, a hollow body portion open at its upper end and having an inlet port adjacent its closed lower end and having also a discharge port, the space in said body portion between said ports being unobstructed, an inlet pipe and a discharge pipe connected to said inlet and discharge ports, respectively, said discharge pipe extending upwardly from said discharge port, a removable cover fast to the upper end of said body portion and a flange on said cover projecting downwardly into said body portion and terminating adjacent to and above the top of said discharge port, whereby said flange will project below the permanent water level in said trap and outlet pipe and the water will have an unobstructed flow through said trap from said inlet port to said discharge port.

2. A trap having, in combination, a hollow body portion open at its upper end and having an inlet port adjacent its closed lower end and having also a discharge port, the space in said body portion between said ports being unobstructed, an inlet pipe and a discharge pipe connected to said inlet and discharge ports, respectively, said discharge pipe extending upwardly from said discharge port and having an outlet opening, the bottom of which is above the top of said discharge port, a removable cover fast to the upper end of said body portion and a flange on said cover projecting downwardly into said body portion and terminating below the bottom of said discharge pipe outlet, and above the top of said discharge port, whereby said flange will project below the permanent water level in said trap and outlet pipe and the water will have an unobstructed flow through said trap from said inlet port to said discharge port.

3. A trap having, in combination, a hollow body portion open at its upper end and having an inlet port adjacent its closed lower end and having also a discharge port, the space in said body portion between said ports being unobstructed, an inlet pipe and a discharge pipe connected to said inlet and discharge ports, respectively, said discharge pipe extending upwardly from said discharge port and having an outlet opening, the bottom of which is above the top of said discharge pipe, a removable cover fast to the upper end of said body portion, a cylindrical flange on said cover projecting downwardly into said body portion and terminating below the bottom of said discharge pipe outlet, and above the top of said discharge port the outer diameter of said cylindrical flange being less than the inner diameter of that portion of said trap to which said cover is fastened, whereby a space is provided between the outside of said cylindrical flange and the inside of said body portion and whereby said flange will project below the permanent water level in said trap and outlet pipe and the water will have an unobstructed flow through said trap from said inlet port to said discharge port.

4. A trap having, in combination, a hollow body portion open at its upper end and having an inlet port adjacent its closed lower end and having also a discharge port, the space in said body portion between said ports being unobstructed, an inlet pipe and a discharge pipe connected to said inlet and discharge ports, respectively, said discharge pipe extending upwardly from said discharge port, a removable cover, a horizontal flange on said cover extending over the upper end of said body portion and means to fasten said flange to said body portion, and a vertical flange on said cover projecting downwardly into said body portion and terminating adjacent to and above the top of said discharge port, whereby said flange will project below the permanent water level in said trap and outlet pipe and the water will have an unobstructed flow through said trap from said inlet port to said discharge port.

5. A trap having, in combination, a hollow body portion open at its upper end and having an inlet port adjacent its closed lower end and having also a discharge port, the space in said body portion between said ports being unobstructed, an inlet pipe and a discharge pipe connected to said inlet and discharge ports, respectively, said discharge pipe extending upwardly from said discharge port and having an outlet opening, the bottom of said discharge pipe extending above the top of said discharge port, whereby the top of said discharge port is located at all times below the water line, a removable closure and screw-threaded means attaching said closure to said body portion and located entirely above the permanent water line of said trap, whereby the water will have an unobstructed flow through said trap from said inlet port to said discharge port and said closure be water sealed.

In testimony whereof I have hereunto set my hand in presence of two subscribing witnesses.

JEREMIAH J. CURTIS.

Witnesses:
CHARLES S. GOODING,
SYDNEY E. TAFT.

Copies of this patent may be obtained for five cents each, by addressing the "Commissioner of Patents, Washington, D. C."